United States Patent Office
3,565,904
Patented Feb. 23, 1971

3,565,904
1,2,3,4-TETRAHYDRO-1-NAPHTHOIC ACIDS
Peter Frederick Juby, De Witt, Richard Anthony Partyka, Liverpool, and Thomas William Hudyma, De Witt, N.Y., assignors to Bristol-Myers Company, New York, N.Y., a corporation of Delaware
No Drawing. Filed Jan. 31, 1969, Ser. No. 795,687
Int. Cl. C07c 63/44, 69/76
U.S. Cl. 260—294
21 Claims

ABSTRACT OF THE DISCLOSURE 6-cyclohexyl- or phenyl-1,2,3,4-tetrahydro-1-naphthoic acids are useful anti-inflammatory agents in the treatment of inflammatory diseases in animals, including man. An example of the disclosure is 6-cyclohexyl-1,2,3,4-tetrahydro-1-naphthoic acid.

BACKGROUND OF THE INVENTION

(1) Field of the invention

The compounds of the present invention relate to 6-cyclohexyl- or phenyl - 1,2,3,4 - tetrahydro - 1 - naphthoic acids, which compounds are useful non-steroidal anti-inflammatory agents.

(2) Description of the prior art

The compounds 4-isobutylphenylacetic acid [South African Pat. 62/294 (1962)], 4-isobutyl-α-methyl-phenylacetic acid [S. S. Adams, E. E. Cliffe, B. Lessel, and J. S. Nicholson, J. Pharm. Sci. 56, 1686 (1967)] and 3-chloro-4-cyclohexyl-α-methyl-phenylacetic acid [T Y. Shen, Chim. Therap., II, 459 (1967)] have been described in the literature as being useful anti-inflammatory agents.

SUMMARY OF THE INVENTION

The 6-cyclohexyl- or phenyl-1,2,3,4-tetrahydro-1-naphthoic acids of the present invention is the compound having the formula

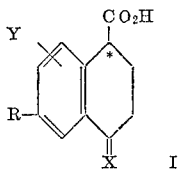

wherein R is cyclohexyl or phenyl, X is $H_2$ or O, and Y is hydrogen, trifluoromethyl, Cl, Br, F, OH, (lower)alkyl, cyano, nitro (lower)alkoxy, mercapto, amino or (lower)alkylthio; or a pharmaceutically-acceptable, nontoxic salt thereof.

DISCLOSURE OF THE INVENTION

This invention relates to non-steroidal anti-inflammatory agents useful in animals, including man, which compound is characterized by the formula

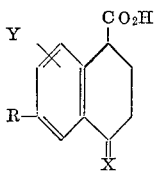

in which R is phenyl or cyclohexyl, X is $H_2$ or O, Y is hydrogen, bromo, chloro, iodo, fluoro, cyano, mercapto, hydroxy, trifluoromethyl (lower)alkyl (lower)alkoxy, nitro, amino or (lower)alkylthio; or a non-toxic, pharmaceutically acceptable salt thereof. The carboxyl group in the compounds of the instant invention is attached to an asymmetric carbon atom (\*). As such, the compounds exist in two isomeric forms, dextro- and levorotatory isomers.

Both the substantially pure dextro- and levorotatory forms of the compound, as well as the racemic mixtures are considered to be an integral part of the invention.

It was an object of the instant invention to prepare non-steroidal anti-inflammatory agents that would be useful in the treatment of a variety of inflammatory diseases such as rheumatoid arthritis, rheumatoid spondylitis, osteoarthritis, gout and other similar afflictions.

These objectives have been achieved by the provision, according to the present invention, of the compound having the formula

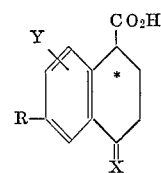

in which R is cyclohexyl or phenyl; X is $H_2$ or O, and Y is H, Cl, Br, I, F, CN, —$CF_3$, OH, SH, (lower)alkoxy, nitro, amino, (lower)alkyl or (lower)alkylthio; or a nontoxic, pharmaceutically acceptable salt thereof.

A more limited and preferred embodiment of the present invention comprises the compound having the Formula I wherein R is cyclohexyl or phenyl, Y is hydrogen, chloro, fluoro, hydroxy, cyano, (lower)alkyl, (lower)alkoxy, nitro or amino; or a nontoxic, pharmaceutically acceptable salt thereof.

A further limited and preferred embodiment of the present invention comprises the compound having the Formula I wherein R is cyclohexyl or phenyl, Y is hydrogen, chloro, (lower)alkyl or (lower)alkoxy; or a pharmaceutically acceptable nontoxic salt thereof.

Another preferred embodiment of the present invention comprises the compound having the formula

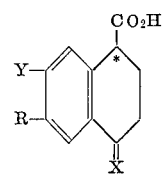

in which X is $H_2$ or O, R is phenyl or cyclohexyl, Y is hydrogen, chloro, bromo, fluoro, trifluoromethyl, hydroxy, (lower)alkoxy, nitro, amino, mercapto, cyano, (lower)alkyl or (lower)alkylthio; or a pharmaceutically-acceptable salt thereof.

A more limited and preferred embodiment of the present invention compises the compound having the Formula II wherein R is cyclohexyl or phenyl, Y is hydrogen, chloro, fluoro, hydroxy, (lower)alkyl, (lower)alkoxy, cyano, nitro or amino; or a pharmaceutically-acceptable, nontoxic salt thereof.

A further limited and preferred embodiment of the present invention comprises the compound having the Formula II wherein R is cyclohexyl or phenyl, Y is hydrogen, chloro, (lower)alkyl or (lower)alkoxy; or a pharmaceutically acceptable, nontoxic salt thereof.

A most preferred embodiment of the present invention comprises the compound having the Formula II wherein R is cyclohexyl and Y is hydrogen or chloro; or a pharmaceutically acceptable, nontoxic salt thereof.

Other most preferred embodiments include the racemic (±) mixtures and the pure resolved (+) and (—) isomers of the following compounds or a pharmaceutically acceptable, nontoxic salt thereof:

(1) 7-chloro-6-cyclohexyl-4-oxo-1,2,3,4-tetrahydro-1-naphthoic acid
(2) 7-chloro-6-cyclohexyl-1,2,3,4-tetrahydro-1-naphthoic acid
(3) 7-chloro-6-phenyl-4-oxo-1,2,3,4-tetrahydro-1-naphthoic acid
(4) 7-chloro-6-phenyl-1,2,3,4-tetrahydro-1-naphthoic acid
(5) 6-cyclohexyl-4-oxo-1,2,3,4-tetrahydro-1-naphthoic acid
(6) 6-cyclohexyl-1,2,3,4-tetrahydro-1-naphthoic acid
(7) 6-phenyl-4-oxo-1,2,3,4-tetrahydro-1-naphthoic acid
(8) 6-phenyl-1,2,3,4-tetrahydro-1-naphthoic acid The pharmaceutically-acceptable, nontoxic cations include metallic cations such as sodium, potassium, calcium and aluminum and organic amine cations of trialkylamines, e.g., procaine, dibenzylamine, N-benzyl-β-phenethylamine, 1-ephenamine, N,N'-dibenzylethylenediamine, dehydroabiethylamine, N,N'-bis-dehydroabietylethylenediamine, N-(lower)alkylpiperidines, e.g. N-ethylpiperidine, and other amines which have been used to form salts of medicinally useful carboxylic acids.

The term "(lower)alkyl" as used herein means both straight and branched chain aliphatic hydrocarbon radicals having from 1 to 6 carbon atoms such as methyl, ethyl, propyl, isopropyl, butyl, isobutyl, etc. Similarly, wherethe term "(lower)" is used as part of the description of an other group e.g. "(lower)alkoxy," it refers to the alkyl portion of such group which is therefore as described above in connection with "(lower)alkyl" and thus includes such radicals as methoxy, ethoxy, isopropoxy, etc.

The 6-phenyl-or cyclohexyl-1,2,3,4-tetrahydro-1-naphthoic acid nuclei of the compounds of the instant invention can be prepared by the following synthesis:

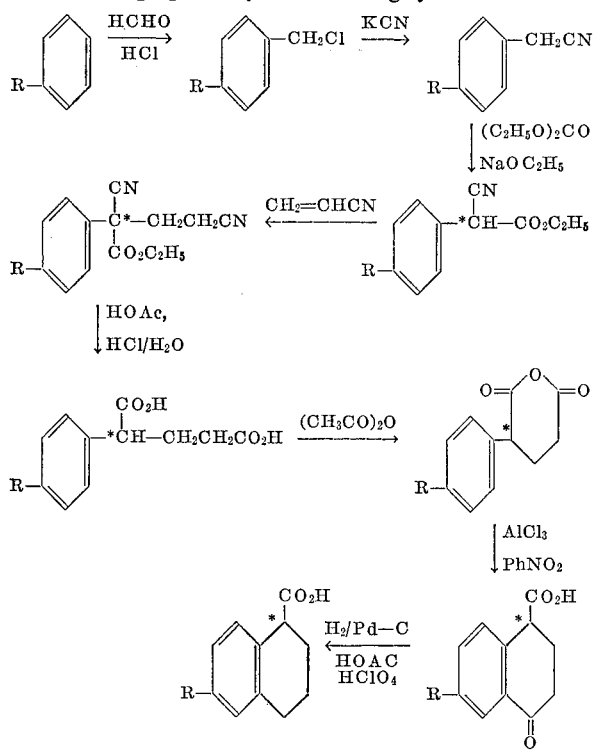

wherein R is cyclohexyl or phenyl.

The optionally Y-substituted 1-naphthoic acids of the present invention can be prepared by one of two synthetic routes:

(a) 7-halosubstituted naphthoic acids: 6-cyclohexyl- or phenyl-1,2,3,4-tetrahydro-1-naphthoic acid is halogenated with N-halosuccinimide to produce 7-halo-6-cyclohexyl- or phenyl-1,2,3,4-tetrahydro-1-naphthoic acids (see Example 3).

(b) 5 or 7-nitrosubstituted naphthoic acids: 6-cyclohexyl- or phenyl-1,2,3,4-tetrahydro-1-naphthoic acid is nitrated with one equivalent of nitric acid in the presence of sulfuric acid to produce a mixture of 5 and 7-nitro-6-cyclohexyl- or phenyl-1,2,3,4-tetrahydro-1-naphthoic acid. The mixture can be separated into pure 5-nitro-6-cyclohexyl- or phenyl-1,2,3,4-tetrahydro-1-naphthoic acid and 7-nitro-6-cyclohexyl-1,2,3,4-tetrahydro-1-naphthoic acid by methods known to the art. These separated 5- or 7-nitrosubstituted compounds are most valuable as intermediates in the preparation of the other claimed compounds of the present invention.

(c) 5 or 7-aminosubstituted naphthoic acids: The purified 5 or 7-nitrosubstituted naphtholic acids obtained in part (b) above are reduced by the use of hydrogen and catalyst (Pd/C, PtO$_2$, etc.) to produce either the 5-amino or 7-amino substituted naphthoic acids of the present invention.

(d) Naphthoic acid diazonium salts: One of the aminosubstituted compounds prepared in step (c) above, for example the 7-aminosubstituted naphthoic acid, is placed in a strong mineral acid, i.e. hydrochloric acid, sulphuric acid, hydrobromic acid, etc., at 0° C. Nitrous acid is generated in situ by the addition of sodium nitrite to produce the diazonium salt of the amine.

(e) 7-hydroxy-6-cyclohexyl- or phenyl-1,2,3,4-tetrahydro-1-naphthoic acid: Heating of the 7-diazonium salt obtained in step (d), after the addition of water, will result in the formation of the 7-hydroxy compound.

(f) 7-alkoxy-6-cyclohexyl- or phenyl-1,2,3,4-tetrahydro-1-naphthoic acid: Heating of the 7-diazonium salt obtained in step (d) after the addition of the appropriate alcohol will result in the formation of the 7-alkoxy compound.

(g) 5-halo-6-cyclohexyl- or phenyl-1,2,3,4-tetrahydro-1-naphthoic acid: The 5-diazonium salt prepared as in step (d) from the 5-aminosubstituted-naphthoic acid obtained in step (c) is treated with either copper bronze (Gattermann Reaction) or cuprous halide (Cl, Br, I) to produce the 5-halosubstituted compound.

(h) 7-cyano-6-cyclohexyl- or phenyl-1,2,3,4-tetrahydro-1-naphthoic acid: The 7-diazonium salts obtained by the procedure of step (d) which is prepared in H$_2$SO$_4$ are treated with base to neutralize the salt solution, followed by the addition of a solution of cuprous cyanide-sodium cyanide complex to produce a precipitate. Heating of the precipitate decomposes same to the 7-cyanosubstituted compound.

(i) 5-fluoro-6-cyclohexyl- or phenyl-1,2,3,4-tetrahydro-1-naphthoic acid: The 5-diazonium salt, as in step (g) is treated with fluoroboric acid. The fluoroborate precipitates and is collected. After washing and drying, the precipitate is heated and it decomposes to the desired 5-fluorosubstituted compound.

(j) 5-mercapto-6-cyclohexyl- or phenyl-1,2,3,4-tetrahydro-1-naphthoic acid: The 5-diazonium salt prepared as in step (d) is treated with potassium ethyl xanthate which produces an ethyl dithiocarbonate. Saponification of the dithiocarbonate produces the desired 5-mercaptosubstituted compound.

(k) 5-methylthio-6-cyclohexyl- or phenyl-1,2,3,4-tetrahydro-1-naphthoic acid: Treatment of the 5-mercaptosubstituted compound obtained in step (j) with dimethylsulfate or diazomethane (followed by mild hydrolysis) will produce the desired 5-methylthiosubstituted compound. The 4-oxo-substituted compounds can be treated in a similar manner.

(l) 5-methyl-6-cyclohexyl or phenyl-1,2,3,4-tetrahydro-1-naphthoic acid: The 5-bromo- or iodo-6-cyclohexyl- or phenyl-1,2,3,4-tetrahydro-1-naphthoic acid obtained in step (g) is treated with lithium dimethylcopper to produce 5-methyl - 6-cyclohexyl-or phenyl - 1,2,3,4-tetrahydro-1- naphthoic acid (E. J. Corey and G. H. Posner, J. Am. Chem. Soc. 89, p. 3911 (1967).

Compounds of the instant invention can be prepared by the utilization of one or more of the disclosed procedures above and they include among others:

7-chloro-6-cyclohexyl-1,2,3,4-tetrahydro-1-naphthoic acid,
5-chloro-6-cyclohexyl-1,2,3,4-tetrahydro-1-naphthoic acid,
7-bromo-6-cyclohexyl-1,2,3,4-tetrahydro-1-naphthoic acid,
5-bromo-6-cyclohexyl-1,2,3,4-tethydro-1-naphthoic acid,
7-Iodo-6-cyclohexyl-1,2,3,4-tetrahydro-1-naphthoic acid,
5-iodo-6-cyclohexyl-1,2,3,4-tetrahydro-1-naphthoic acid,
7-fluoro-6-cyclohexyl-1,2,3,4-tetrahydro-1-naphthoic acid,
5-fluoro-6-cyclohexyl-1,2,3,4-tetrahydro-1-naphthoic acid,
7-hydroxy-6-cyclohexyl-1,2,3,4-tetrahydro-1-naphthoic acid,
5-hydroxy-6-cyclohexyl-1,2,3,4-tetrahydro-1-naphthoic acid,
7-methoxy-6-cyclohexyl-1,2,3,4-tetrahydro-1-naphthoic acid,
5-methoxy-6-cyclohexyl-1,2,3,4-tetrahydro-1-naphthoic acid,
7-nitro-6-cyclohexyl-1,2,3,4-tetrahydro-1-naphthoic acid,
5-nitro-6-cyclohexyl-1,2,3,4-tetrahydro-1-naphthoic acid,
7-amino-6-cyclohexyl-1,2,3,4-tetrahydro-1-naphthoic acid,
5-amino-6-cyclohexyl-1,2,3,4-tetrahydro-1-naphthoic acid,
7-cyano-6-cyclohexyl-1,2,3,4-tetrahydro-1-naphthoic acid,
5-cyano-6-cyclohexyl-1,2,3,4-tetrahydro-1-naphthoic acid,
7-methyl-6-cyclohexyl-1,2,3,4-tetrahydro-1-naphthoic acid,
5-methyl-6-cyclohexyl-1,2,3,4-tetrahydro-1-naphthoic acid,
7-mercapto-6-cyclohexyl-1,2,3,4-tetrahydro-1-naphthoic acid,
5-mercapto-6-cyclohexyl-1,2,3,4-tetrahydro-1-naphthoic acid,
7-methylthio-6-cyclohexyl-1,2,3,4-tetrahydro-1-naphthoic acid,
5-methylthio-6-cyclohexyl-1,2,3,4-tetrahydro-1-naphthoic acid,
7-chloro-6-phenyl-1,2,3,4-tetrahydro-1-naphthoic acid,
5-chloro-6-phenyl-1,2,3,4-tetrahydro-1-naphthoic acid,
7-bromo-6-phenyl-1,2,3,4-tetrahydro-1-naphthoic acid,
5-bromo-6-phenyl-1,2,3,4-tetrahydro-1-naphthoic acid,
7-iodo-6-phenyl-1,2,3,4-tetrahydro-1-naphthoic acid,
5-iodo-6-phenyl-1,2,3,4-tetrahydro-1-naphthoic acid,
7-fluoro-6-phenyl-1,2,3,4-tetrahydro-1-naphthoic acid,
5-fluoro-6-phenyl-1,2,3,4-tetrahydro-1-naphthoic acid,
7-hydroxy-6-phenyl-1,2,3,4-tetrahydro-1-naphthoic acid,
5-hydroxy-6-phenyl-1,2,3,4-tetrahydro-1-naphthoic acid,
7-methoxy-6-phenyl-1,2,3,4-tetrahydro-1-naphthoic acid,
5-methoxy-6-phenyl-1,2,3,4-tetrahydro-1-naphthoic acid,
7-nitro-6-phenyl-1,2,3,4-tetrahydro-1-naphthoic acid,
5-nitro-6-phenyl-1,2,3,4-tetrahydro-1-naphthoic acid,
7-amino-6-phenyl-1,2,3,4-tetrahydro-1-naphthoic acid,
5-amino-6-phenyl-1,2,3,4-tetrahydro-1-naphthoic acid,
7-cyano-6-phenyl-1,2,3,4-tetrahydro-1-naphthoic acid,
5-cyano-6-phenyl-1,2,3,4-tetrahydro-1-naphthoic acid,
7-methyl-6-phenyl-1,2,3,4-tetrahydro-1-naphthoic acid,
5-methyl-6-phenyl-1,2,3,4-tetrahydro-1-naphthoic acid,
7-mercapto-6-phenyl-1,2,3,4-tetrahydro-1-naphthoic acid,
5-mercapto-6-phenyl-1,2,3,4-tetrahydro-1-naphthoic acid,
7-methylthio-6-phenyl-1,2,3,4-tetrahydro-1-naphthoic acid,
5-methylthio-6-phenyl-1,2,3,4-tetrahydro-1-naphthoic acid,
7-chloro-6-cyclohexyl-4-oxo-1,2,3,4-tetrahydro-1-naphthoic acid,
5-chloro-6-cyclohexyl-4-oxo-1,2,3,4-tetrahydro-1-naphthoic acid,
7-bromo-6-cyclohexyl-4-oxo-1,2,3,4-tetrahydro-1-naphthoic acid,
5-bromo-6-cyclohexyl-4-oxo-1,2,3,4-tetrahydro-1-naphthoic acid,
7-iodo-6-cyclohexyl-4-oxo-1,2,3,4-tetrahydro-1-naphthoic acid,
5-iodo-6-cyclohexyl-4-oxo-1,2,3,4-tetrahydro-1-naphthoic acid,
7-fluoro-6-cyclohexyl-4-oxo-1,2,3,4-tetrahydro-1-naphthoic acid,
5-fluoro-6-cyclohexyl-4-oxo-1,2,3,4-tetrahydro-1-naphthoic acid,
7-hydroxy-6-cyclohexyl-4-oxo-1,2,3,4-tetrahydro-1-naphthoic acid,
5-hydroxy-6-cyclohexyl-4-oxo-1,2,3,4-tetrahydro-1-naphthoic acid,
7-methoxy-6-cyclohexyl-4-oxo-1,2,3,4-tetrahydro-1-naphthoic acid,
5-methoxy-6-cyclohexyl-4-oxo-1,2,3,4-tetrahydro-1-naphthoic acid,
7-nitro-6-cyclohexyl-4-oxo-1,2,3,4-tetrahydro-1-naphthoic acid,
5-nitro-6-cyclohexyl-4-oxo-1,2,3,4-tetrahydro-1-naphthoic acid,
7-amino-6-cyclohexyl-4-oxo-1,2,3,4-tetrahydro-1-naphthoic acid,
5-amino-6-cyclohexyl-4-oxo-1,2,3,4-tetrahydro-1-naphthoic acid,
7-cyano-6-cyclohexyl-4-oxo-1,2,3,4-tetrahydro-1-naphthoic acid,
5-cyano-6-cyclohexyl-4-oxo-1,2,3,4-tetrahydro-1-naphthoic acid,
7-methyl-6-cyclohexyl-4-oxo-1,2,3,4-tetrahydro-1-naphthoic acid,
5-methyl-6-cyclohexyl-4-oxo-1,2,3,4-tetrahydro-1-naphthoic acid,
7-mercapto-6-cyclohexyl-4-oxo-1,2,3,4-tetrahydro-1-naphthoic acid,
5-mercapto-6-cyclohexyl-4-oxo-1,2,3,4-tetrahydro-1-naphthoic acid,
7-methylthio-6-cyclohexyl-4-oxo-1,2,3,4-tetrahydro-1-naphthoic acid,
5-methylthio-6-cyclohexyl-4-oxo-1,2,3,4-tetrahydro-1-naphthoic acid,
7-chloro-6-phenyl-4-oxo-1,2,3,4-tetrahydro-1-naphthoic acid,
5-chloro-6-phenyl-4-oxo-1,2,3,4-tetrahydro-1-naphthoic acid,
7-bromo-6-phenyl-4-oxo-1,2,3,4-tetrahydro-1-naphthoic acid,
5-bromo-6-phenyl-4-oxo-1,2,3,4-tetrahydro-1-naphthoic acid,
7-iodo-6-phenyl-4-oxo-1,2,3,4-tetrahydro-1-naphthoic acid,
5-iodo-6-phenyl-4-oxo-1,2,3,4-tetrahydro-1-naphthoic acid,
7-fluoro-6-phenyl-4-oxo-1,2,3,4-tetrahydro-1-naphthoic acid,
5-fluoro-6-phenyl-4-oxo-1,2,3,4-tetrahydro-1-naphthoic acid,
7-hydroxy-6-phenyl-4-oxo-1,2,3,4-tetrahydro-1-naphthoic acid,
5-hydroxy-6-phenyl-4-oxo-1,2,3,4-tetrahydro-1-naphthoic acid,
7-methoxy-6-phenyl-4-oxo-1,2,3,4-tetrahydro-1-naphthoic acid,
5-methoxy-6-phenyl-4-oxo-1,2,3,4-tetrahydro-1-naphthoic acid, 7-nitro-6-phenyl-4-oxo-1,2,3,4-tetrahydro-1-naphthoic acid,
5-nitro-6-phenyl-4-oxo-1,2,3,4-tetrahydro-1-naphthoic acid,
7-amino-6-phenyl-4-oxo-1,2,3,4-tetrahydro-1-naphthoic acid,
5-amino-6-phenyl-4-oxo-1,2,3,4-tetrahydro-1-naphthoic acid,
7-cyano-6-phenyl-4-oxo-1,2,3,4-tetrahydro-1-naphthoic acid,
5-cyano-6-phenyl-4-ozo-1,2,3,4-tetrahydro-1-naphthoic acid,
7-methyl-6-phenyl-4-oxo-1,2,3,4-tetrahydro-1-naphthoic acid,
5-methyl-6-phenyl-4-oxo-1,2,3,4-tetrahydro-1-naphthoic acid,
7-mercapto-6-phenyl-4-oxo-1,2,3,4-tetrahydro-1-naphthoic acid,
5-mercapto-6-phenyl-4-oxo-1,2,3,4-tetrahydro-1-naphthoic acid,
7-methylthio-6-phenyl-4-oxo-1,2,3,4-tetrahydro-1-naphthoic acid,
5-methylthio-6-phenyl-4-oxo-1,2,3,4-tetrahydro-1-naphthoic acid.

The racemic compounds of the instant invention can be resolved into their substantially pure dextrorotatory and levorotatory isomers by methods commonly known in the art. Some racemic mixtures can be precipitated as eutectics instead of mixed crystals and can thus be quickly separated and in such cases can sometimes be selectively precipitated. The more common method of chemical resolution may be used. By this method diastereomers are formed from the racemic mixture by reaction with an optically-active resolving agent. Thus, an optically-active base can be reacted with the carboxyl group. The difference in solubility between the diastereomers formed permits the selective crystallization of one form and regeneration of the optically-active acid from the mixture. There is however, a third method of resolving which shows great promise. This is one or the other forms of biochemical procedures using selective enzymatic reaction. Thus, the racemic acid can be subjected to an asymmetric oxidase or decarboxylase which will, by oxidation or decarboxylation, destroy one form, leaving the other form unchanged. Even more attractive is the use of a hydrolylase on a derivative of the racemic mixture to form preferentially one form of the acid. Thus, esters or amides of the acids can be subjected to an esterase or amidase which will selectively saponify one enantiomorph and leave the other unchanged. Amide or salt diastereomers of the free acid may be formed with optically-active amines, such as quinine, brucine, cinchonidine, cinchonine, dehydroabietylamine, hydroxy-hydrindamine, menthylamine, morphine, α-phenylethylamine, phenyloxynaphthylmethylamine, quinidine, 1-fenchylamine, strychnine, basic amino acids, such as lysine, arginine, amino acid esters, and the like. Similarly, ester diastereomers of the free acid may be formed with optically-active alcohols, such as borneol, menthol, 2-octanol and the like. Especially preferred is the use of cinchonidine to give the readily decomposable diastereomer salt which may then be resolved by dissolving in a solvent, such as acetone, and distilling the solvent at atmospheric pressure until crystals begin to appear and further crystallization produced by allow the mixture to cool to room temperature, thereby separating the two enantiomorphs. The acid may then be recovered from the salt by extracting the salt between an organic solvent, such as petroleum ether and dilute hydrochloric acid or some other organic solvent-aqueous system. Workup of the remaining mother liquors and subsequent purification will usually provide the other isomer.

It is noted however, the racemic mixtures themselves are potent anti-inflammatory agents.

The compounds of this invention have a high degree of anti-inflammatory activity, making them potent anti-inflammatory agents; and are useful in treating arthritis, rheumatism and other inflammatory diseases in mammals.

Anti-inflammatory tests of the compounds of the present invention were carried out on rats using the carrageenin-induced foot edema test of Charles A. Winter et al., Carrageenin-Induced Edem in Hind Paw of the Rat as an Assay for Anti-Inflammatory Drugs, Proceedings of the Society for Experimental Biology and Medicine, 111, 544 (1962). The compound under investigation was given orally to the rat, and one hour later carrageenin was injected subcutaneously into one paw. Three hours later the degree of edema was measured volumetrically by fluid displacement, and compared to that of the control paw to give a result presented in terms of percentage inhibition of edema. Any result of more than 30% inhibition was greater than three times the standard deviation of the result in control animals, and thus clearly indicated anti-inflammatory activity.

In the rat paw edema test described above, the compounds of the instant invention exhibit anti-inflammatory activity deemed useful in the treatment of inflammatory diseases in mammals, including man. The compounds of the invention are generally useful in the dosage range of about 0.5 mg./kg. to about 75 mg./kg. three to four times a day. They are administered orally or parenterally, but preferably orally. More specifically, the compounds of the instant invention are preferentially administered in dosages in the range of about 1.0 mg./kg. to about 50 mg./kg. three to four times a day.

The dosage will vary with the particular compound of the invention. For example, 6-cyclohexyl - 1,2,3,4-tetrahydro-1-naphthoic acid produces a 53% inhibition of edema at a dose of 150 mg./kg. with an MED (minimum effective dose that will produce 30% inhibition of edema) of 64 mg./kg. 6-cyclohexyl - 4-oxo - 1,2,3,4-tetrahydro-1-naphthoic acid likewise has an MED of 64 mg./kg. and produces a 57% inhibition of edema at 150 mg./kg.

Both 6 - phenyl - 1,2,3,4-tetrahydro - 1-naphthoic acid and 6-phenyl - 4 - oxo-1,2,3,4 - tetrahydro - 1 - naphthoic acid have an MED of about 128 mg./kg. and produce a 21% and 31% inhibition of edema respectively at a dose of 128 mg./kg.

The oral dosage in humans is in the range of about 0.5 mg./kg. to about 50 mg./kg. The preferred human dosage is in the range of 0.2 mg./kg. to about 25 mg./kg. three of four times a day.

The following examples will serve to illustrate but not to limit the scope of the present invention.

DESCRIPTION OF THE PREFERRED EMBODIMENTS

EXAMPLE 1

Preparation of 6-cyclohexyl-1,2,3,4-tetrahydro-1-naphthoic acid (A) p - Cyclohexylphenylacetonitrile: p - Cyclohexylbenzyl chloride (10.0 grams, 0.048 mole) was treated with potassium cyanide (4.16 grams, 0.064 mole) according to a standard procedure [R. Adams and A. F. Thal, "Organic Synthesis," Coll. vol. I, 2nd ed., John Wiley and Sons, Inc., New York, N.Y. 1941, p. 107]. The crude product was purified by distillation and recrystallization from n-pentane to give p - cyclohexylphenylacetonitrile (5.8 grams, 61%) as colorless crystals, M.P. 43.5–45° C. [Buu-Hoï, P. Cagniant, and C. Mentzer, Bull Soc. Chem. Fr., 11, 127 (1944)].

(B) Ethyl α - Cyano-α - (p - cyclohexylphenyl)acetate: p-cyclohexylphenylacetonitrile (20.0 grams, 0.0958 mole) was treated with diethyl carbonate (75 ml.) and sodium ethoxide (from sodium, 2.39 grams, 0.104 mole, and ethanol, 60 ml.) according to the method described for the synthesis of ethyl phenylcyanoacetate from phenlyacetonitrile [E. C. Horning and A. F. Finelli, "Organic Synthesis," Coll. vol. IV, John Wiley and Sons, Inc., New York, N.Y., 1963, p. 461]. The ethyl α-cyano-α - (p-cyclohexylphenyl)acetate (19.89 grams, 76.5%) with B.P. 150–164° C./0.05–0.12 mm., was redistilled to give a colorless oil, B.P. 160–163° C./0.12 mm.

Analysis.—Calc'd for $C_{17}H_{21}N_2$ (percent): C, 75.24; H, 7.86; N, 5.16. Found (percent): C, 75.25; H, 7.86; N, 5.47.

(C) α - Carbethoxy - α-(p - cyclohexylphenyl)glutaronitrile: Ethyl α - cyano-α - (p-cyclohexylphenyl) acetate (17.41 grams, 0.0643 mole) was treated with acrylonitrile (7.05 grams, 0.133 mole) in t-butyl alcohol (28 ml.) containing 30% potassium hydroxide in methanol (0.43 ml.) according to the method described for the synthesis of α-carbethoxy - α-phenylglutaronitrile [E. C. Horning and A. F. Finelli, "Organic Syntheses," Coll. vol. IV, John Wiley and Sons, Inc., New York, N.Y., 1963, p. 776]. The α-carbethoxy - α-(p-cyclohexylphenyl) glutaronitrile (18.4 grams, 88%), M.P. 66–70°, was recrystallized from petroleum ether (B.P. 30–60° C.) to give colorless crystals, M.P. 69–70.5° C.

Analysis.—Calc'd for $C_{20}H_{24}N_2O_2$ (percent): C, 74.04; H, 7.46; N, 8.64. Found (percent): C, 74.08; H, 7.52; N, 9.03.

(D) α-(p-Cyclohexylphenyl)glutaric acid: A mixture of α - carbethoxy-α-(p - cyclohexylphenyl)glutaronitrile (203 grams), glacial acetic acid (1200 ml.), and concentrated hydrochloric acid (1200 ml.) was heated under reflux for 16.5 hours. The reaction mixture was concentrated and the residue partitioned between water and ethyl acetate: diethyl ether (1:1). The aqueous layer was saturated with sodium chloride and re-extracted with ethyl acetate: diethyl ether (1:1). The combined organic solution was washed with saturated aqueous sodium chloride, dried, and concentrated. The product was crystallized from carbon tetrachloride, M.P. 86–93° C.

(E) α-(p-Cyclohexylphenyl)glutaric anhydride: A solution of α-(p-cyclohexylphenyl)glutaric acid (1.2 grams) in acetic anhydride (25 ml.) was heated under reflux for 1.5 hours. The solution was concentrated in a rotary evaporator and the residue crystallized from benzene-Skellysolve B (essentially n-hexane, B.P. 60–68° C.) to give α-(p-cyclohexylphenyl)glutaric anhydride (0.466 gram, 41.5%) as colorless crystals, M.P. 102–104° C. An additional croy (0.1 g. of the anhydride, M.P. 97–100° C., was obtained from the mother liquors. The anhydride with M.P. 102–104° C. was recrystallized from cyclohexane to give colorless crystals, M.P. 102.5–103.5° C.

Analysis.—Calc'd for $C_{17}H_{20}O_3$ (percent): C, 74.97; H, 7.40. Found (percent): C, 74.67; H, 7.38.

(F) 6-cyclohexyl-4-oxo-1,2,3,4-tetrahydro-1-naphthoic acid: α-(p-Cyclohexylphenyl)glutaric anhydride (1.0 gram, 0.00367 mole) was added to a stirred, cooled (ice-water) mixture of aluminum chloride (1.08 gram, 0.00808 mole) in nitrobenzene (12 ml.). The mixture was heated by means of an oil bath maintained at 54° for two hours. To the cooled mixture was added ice-cold water (15 ml.) and 1 N hydrochloric acid (10 ml.). The nitrobenzene was removed by steam distillation. The aqueous residue was extracted with diethyl ether. The ether extract was washed with water, dried (sodium sulfate), and concentrated. The residue (1.05 grams) was chromatographed on silicic acid (40 grams, pH 4–5.5) with benzene: acetone (20:1) to yield 6-cyclohexyl-4-oxo-1,2,3,4-tetrahydro-1-naphthoic acid (0.528) gram, 53%) as colorless crystals, M.P. 102° C.–104° C., after recrystallization from benzene-Skellysolve B. After recrystallization from benzene-Skellysolve B the product had M.P. 103–105° C.

Analysis.—Cal'd for $C_{17}H_{20}O_3$ (percent): C, 74.97; H, 7.40. Found (percent): C, 74.99; H, 7.51.

(G) 6-Cyclohexyl-1,2,3,4-tetrahydro-1-naphthoic acid. A solution of 6-cyclohexyl-4-oxo-1,2,3,4-tetrahydro-1-naphthoic acid (0.545 gram) in glacial acetic acid (50 ml.) containing 60% perchloric acid (1 ml.) and 10% palladium on carbon (0.2 gram) was shaken with hydrogen (Parr hydrogenator, 3 atmos.) until no further hydrogen was absorbed. Sodium acetate trihydrate (1.5 gram) was added to the mixture which was then filtered. The filtrate was reduced to dryness. The residue was treated with three small portions of toluene, the mixture being reduced to dryness after each addition. The residue was partitioned between diethyl ether and water. The ether layer was washed with saturated aqueous sodium chloride, dried (sodium sulfate) and concentrated. The residue was recrystallized from Skellysolve B to give 6-cyclohexyl-1,2,3,4-tetrahydro-1-naphthoic acid (0.323 gram, 62.5%) as off-white crystals, M.P. 127–130° C. Two recrystallizations from Skellysolve B gave the product as off-white crystals, M.P. 129–130° C.

Analysis.—Calc'd for $C_{17}H_{22}O_2$ (percent): C, 79.03; H, 8.58. Found (percent): C, 79.13; H, 8.79.

EXAMPLE 2

Preparation of 6-phenyl-1,2,3,4-tetrahydro-1-naphthoic acid (A) Ethyl α-(p-biphenylyl)-α-cyanoacetate [E. Testa, A. Bonatti, G. Pagani, and E. Gatti, Ann. Chem., 647, 92 (1961)]: In a similar manner to Example 1(B), ethyl α-(p-biphenylyl)-α-cyanoacetate (93% yield) was prepared from p-biphenylylacetonitrile.

(B) α-(p-Biphenylyl)-α-carbethoxyglutaronitrile): In a similar manner to Example 1(C), α-(p-biphenylyl-α-carbethoxyglutaronitrile (100% crude yield) was prepared from ethyl α-(p-biphenylyl-α-cyanoacetate. The product was purified by shortpath distillation, to give a viscous yellow oil, B.P. about 170° C./0.01 mm.

Analysis.—Calc'd for $C_{20}H_{18}N_2O_2$ (percent): C, 75.45; H, 5.70; N, 8.80. Found (percent): C, 75.65; H, 5.77; N, 9.08.

(C) α-(p-Biphenylyl)glutaric acid: A mixture of α-(p-biphenylyl) - α - carbethoxyglutaronitrile (5.33 grams), glacial acetic acid (30 ml.) and concentrated hydrochloric acid (30 ml.) was heated under reflux for sixteen hours. A crystalline solid separated from the reaction mixture upon cooling. The mixture was diluted with a small volume of water, and the solid collected by filtration, washed with water, and partially dried. The solid was recrystallized from toluene to give α-(p-biphenylyl)-glutaric acid (3.9 grams, 82%) as colorless crystals, M.P. 170.5–172° C. Recrystallization from toluene gave the product as colorless crystals, M.P. 170.5–172.5° C.

Analysis.—Calc'd for $C_{17}H_{16}O_4$ (percent): C, 71.82; H, 5.67. Found (percent): C, 71.85; H, 5.83.

(D) α-(p-biphenylyl)glutaric anhydride: A mixtures of α-(p-biphenylyl)glutaric acid 1.0 gram) in acetic anhydride (20 ml.) was heated under reflux for 2.5 hours. The reaction mixture was reduced to dryness in a rotary evaporator. The residue was treated with three 20 ml. portions of n-heptane, the mixture being reduced to dryness after each addition. The residue was recrystallized from methyl isobutyl ketone to give α-(p-biphenylyl)-glutaric anhydride (0.701 gram, 75%), M.P. 234–238° C. Two recrystallizations from methyl isobutyl ketone gave the anhydride with M.P. 236–238° C.

Analysis.—Calc'd for $C_{17}H_{14}O_3$ (percent): C, 76.67; H, 5.30. Found (percent): C, 76.60; H, 5.56.

(E) 6 - phenyl-4-oxo-1,2,3,4-tetrahydro-1-naphthoic acid: In a similar manner to Example 1(F), 6-phenyl-4-oxo-1,2,3,4-tetrahydro-1-naphthoic acid (47% yield) was prepared from α-(p-biphenylyl)glutaric anhydride. After two recrystallizations from ethanol-water, with charcoal treatment, the product had M.P. 182° C.–184° C.

Analysis.—Calc'd for $C_{17}H_{14}O_3$ (percent): C, 76.67; H, 5.30. Found (percent): C, 76.65; H, 5.65.

(F) 6 - phenyl-1,2,3,4-tetrahydro-1-naphthoic acid: 6-phenyl-1,2,3,4-tetrahydro-1-naphthoic acid (82%), M.P. 153.5–155.5° C. after recrystallization from cyclohexane, was obtained from the reduction of 6-phenyl-4-oxo-1,2,3,4- tetrahydro-1-naphthoic acid by a method similar to that described in Example 1G. Recrystallization from cyclohexane gave the product with M.P. 154.5–156° C.

Analysis.—Calc'd for $C_{17}H_{16}O_2$ (percent): C, 80.92; H, 6.39. Found (percent): C, 81.09; H, 6.65.

EXAMPLE 3

Sodium 6-cyclohexyl-1,2,3,4-tetrahydro-1-naphthoate

A solution of sodium 2-ethylhexanoate (6.15 grams, 0.037 mole) in acetone (30 ml.) is added to a solution of 5-cyclohexyl-1,2,3,4-tetrahydro-1-naphthoic acid (9.3 grams, 0.0368 mole) in warm acetone (70 ml.). The mixture is allowed to stand and cool to room temperature. The crystalline solid (7.40 grams) that forms is collected, washed with acetone, and recrystallized from methanol-acetone to produce sodium 6-cyclohexyl-1,2,3,4-tetrahydro-1-naphthoate.

EXAMPLE 4

7-chloro-6-cyclohexyl-1,2,3,4-tetrahydro-1-naphthoic acid

N-chlorosuccinimide (8.2 grams, 0.0614 mole) is added to a stirred, cooled (ice-water) solution of 6-cyclohexyl-1,2,3,4-tetrahydro-1-naphthoic acid (10.6 grams, 0.041 mole) in dimethylformamide (82 ml.). The solution is stirred for fifteen minutes at 0° C., thirty minutes at 25° C., nine hours at 50° C. followed by eight hours, at 25° C. The solution is diluted with cold water (400 ml.) and stirred until the precipitated product turns granular. The crude product is collected, washed with cold water, and dried. Crystallization from Skellysolve B with charcoal treatment gives colorless crystals. The product is recrystallized twice from Skellysolve B to produce the title product.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:
1. A compound having the formula

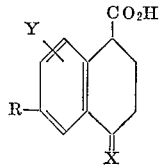

wherein X is $H_2$ or O, R is cyclohexyl or phenyl, and Y is hydrogen, chloro, bromo, iodo, fluoro, hydroxy, (lower)alkyl, (lower)alkoxy, nitro, cyano amino or (lower)-alkylthio; or a nontoxic, pharmaceutically acceptable salt thereof.

2. A compound of claim 1 wherein X is $H_2$.
3. A compound of claim 1 wherein X is O.
4. A compound having the formula

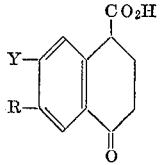

wherein R is phenyl or cyclohexyl and Y is hydrogen, cyano, chloro, bromo, iodo, fluoro, hydroxy, (lower)alkyl, (lower)alkoxy, nitro, amino or (lower)alkylthio; or a nontoxic, pharmaceutically acceptable salt thereof.

5. A compound of claim 4 wherein R is phenyl or cyclohexyl and Y is hydrogen, chloro, fluoro, hydroxy, (lower)alkyl, (lower)alkoxy, nitro or amino; or a pharmaceutically-acceptable nontoxic salt thereof.

6. A compound of claim 4 wherein R is phenyl or cyclohexyl and Y is hydrogen, chloro, (lower)alkyl or (lower)alkoxy; or a pharmaceutically-acceptable, nontoxic salt thereof.

7. The essentially pure levorotatory isomer of the compound of claim 4.

8. The essentially pure dextrorotatory isomer of the compound of claim 4.

9. 7-chloro-6-cyclohexyl-4-oxo-1,2,3,4-tetrahydro-1-naphthoic acid or a pharmaceutically acceptable, nontoxic salt thereof.

10. 6-cyclohexyl-4-oxo-1,2,3,4-tetrahydro-1-naphthoic acid or a pharmaceutically-acceptable, nontoxic salt thereof.

11. 7-chloro-6-phenyl-4-oxo-1,2,3,4-tetrahydro-1-naphthoic acid or a pharmaceutically-acceptable, nontoxic salt thereof.

12. 6-phenyl-4-oxo-1,2,3,4-tetrahydro-1-naphthoic acid or a pharmaceutically-acceptable, nontoxic salt thereof.

13. A compound having the formula

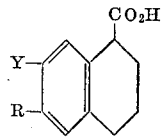

wherein R is phenyl or cyclohexyl and Y is hydrogen, cyano, chloro, bromo, iodo, fluoro, hydroxy, (lower)alkyl, (lower)alkoxy, nitro, amino or (lower)alkylthio; or a nontoxic, pharmaceutically-acceptable salt thereof.

14. A compound of claim 13 wherein R is a phenyl or cyclohexyl, and Y is hydrogen, chloro, fluoro, hydroxy, (lower)alkyl, (lower)alkoxy, nitro or amino; or a pharmaceutically-acceptable, nontoxic salt thereof.

15. A compound of claim 13 wherein R is phenyl or cyclohexyl and Y is hydrogen, chloro, (lower)alkyl or (lower)alkoxy; or a pharmaceutically-acceptable, nontoxic salt thereof.

16. The essentially pure levorotatory isomer of the compound of claim 13.

17. The essentially pure dextrorotatory isomer of the compound of claim 13.

18. 7-chloro-6-cyclohexyl-1,2,3,4-tetrahydro-1-naphthoic acid or a pharmaceutically-acceptable, nontoxic salt thereof.

19. 6-cyclohexyl-1,2,3,4-tetrahydro-1-naphthoic acid or a pharmaceutically acceptable, nontoxic salt thereof.

20. 7-chloro-6-phenyl-1,2,3,4-tetrahydro-1-naphthoic acid or a pharmaceutically-acceptable, nontoxic salt thereof.

21. 6-phenyl-1,2,3,4-tetrahydro-1-naphthoic acid or a pharmaceutically-acceptable, nontoxic salt thereof.

References Cited

Shen: Chem. Therap. II, 459 (1967).

JAMES A. PATTEN, Primary Examiner

U.S. Cl. X.R.

260—141, 283, 284, 285, 345.1, 448, 465, 469, 470, 471, 472, 473, 501.1, 501.17, 515, 516, 518, 649; 424—317

Notice of Adverse Decision in Interference

In Interference No. 98,096 involving Patent No. 3,565,904, P. F. Juby, R. A. Partyka and T. W. Hudyma, final judgment adverse to the patentees was rendered Nov. 13, 1974, as to claims 1–6, 10, 13–15 and 19.

[*Official Gazette February 18, 1975.*]